July 24, 1951　　　　　J. C. McCUNE　　　　　2,561,445
DISK BRAKE

Filed March 12, 1947　　　　　　　　　　　　　5 Sheets—Sheet 1

INVENTOR
JOSEPH C. McCUNE
BY Frank E. Miller
his ATTORNEY

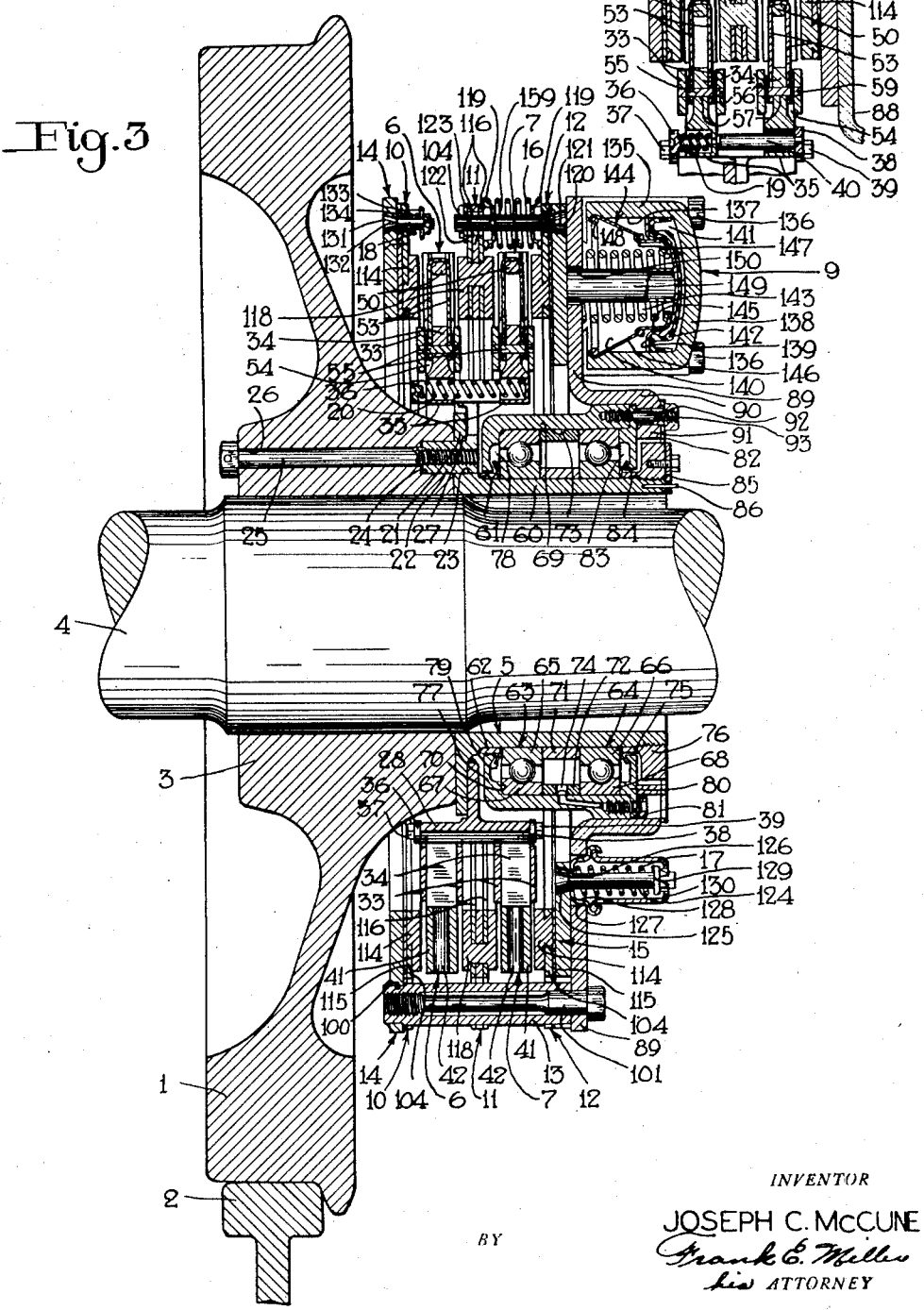

July 24, 1951   J. C. McCUNE   2,561,445
DISK BRAKE
Filed March 12, 1947   5 Sheets-Sheet 3
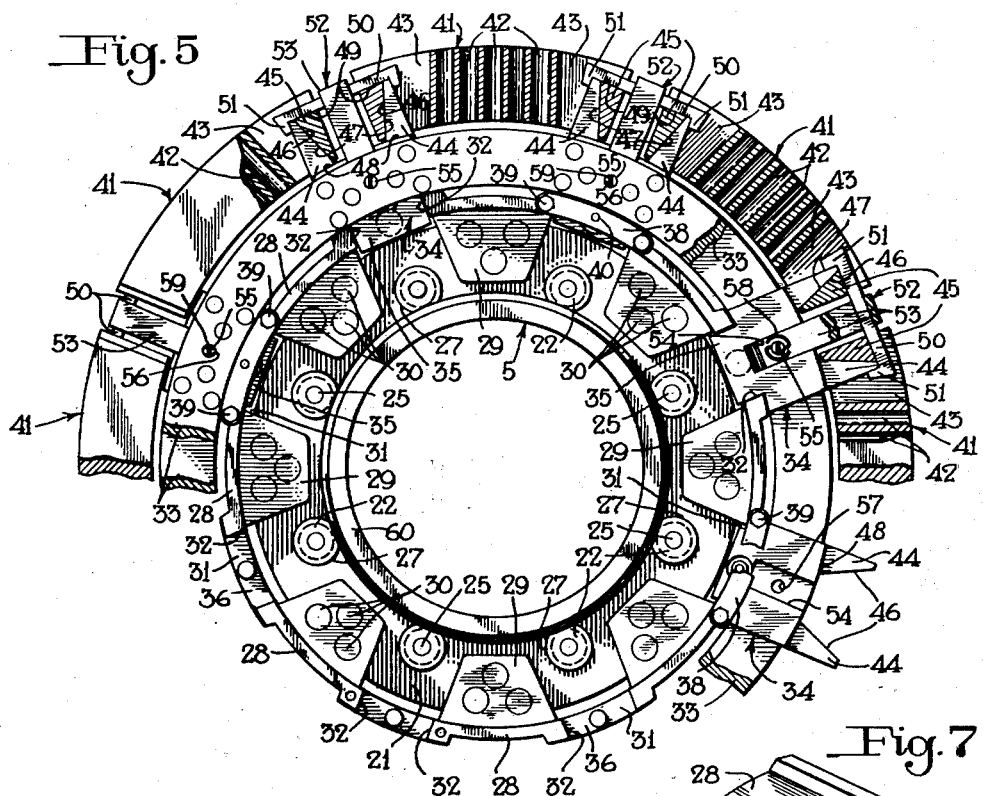
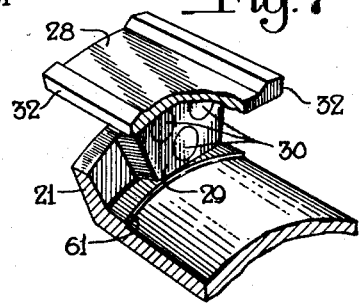
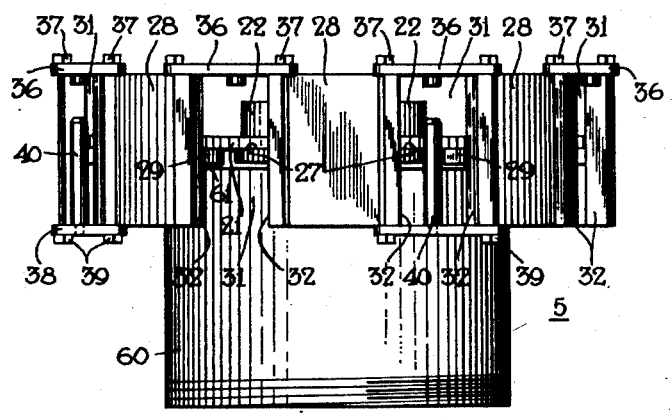
INVENTOR
Joseph C. McCune
BY Frank E. Miller
his ATTORNEY July 24, 1951

J. C. McCUNE 2,561,445

DISK BRAKE

Filed March 12, 1947

INVENTOR
JOSEPH C. McCUNE
BY Frank E. Miller
his ATTORNEY

July 24, 1951     J. C. McCUNE     2,561,445
DISK BRAKE
Filed March 12, 1947     5 Sheets-Sheet 5
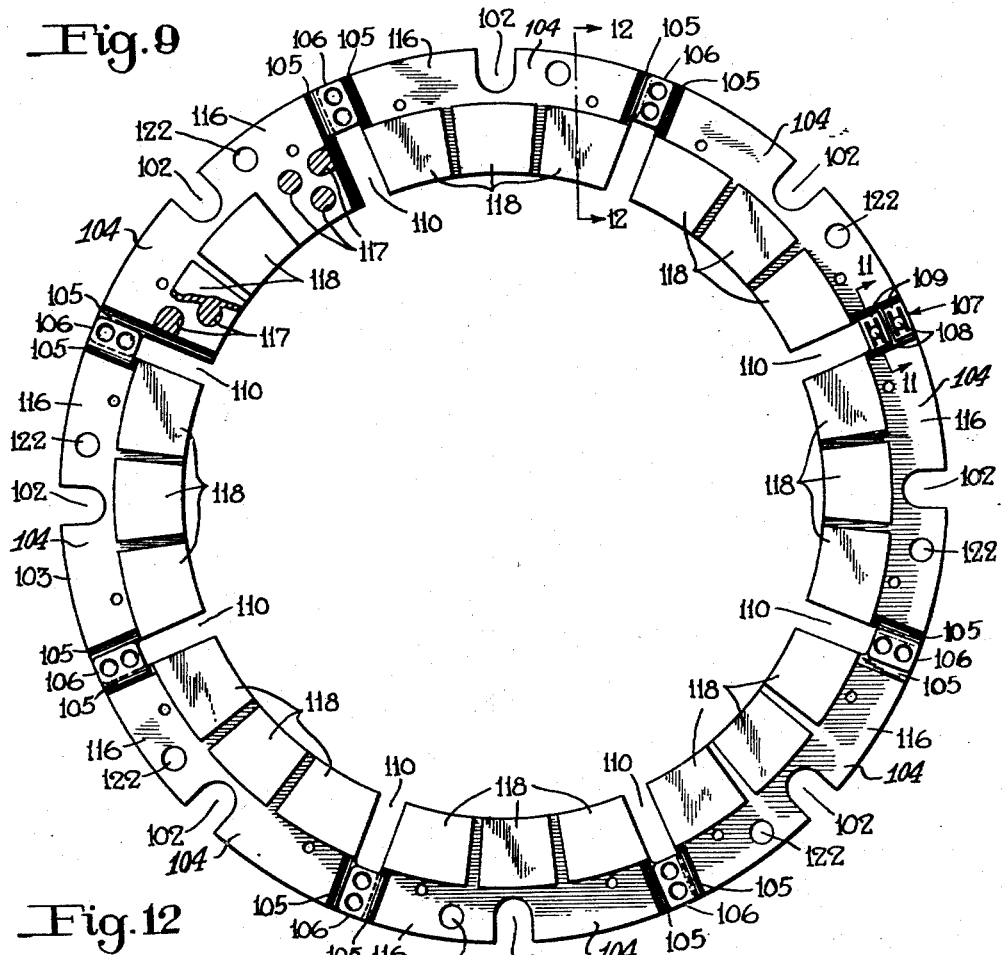
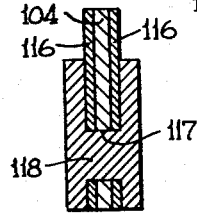
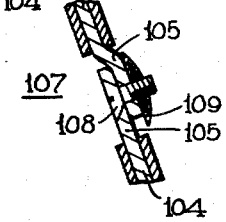
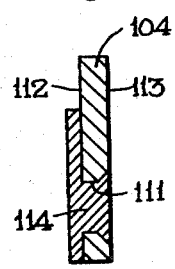
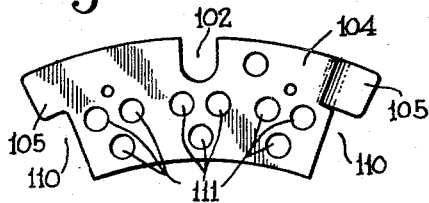
INVENTOR
Joseph C. McCune
BY
Frank E. Miller
ATTORNEY Patented July 24, 1951

2,561,445

UNITED STATES PATENT OFFICE 2,561,445

DISK BRAKE

Joseph C. McCune, Edgewood, Pa., assignor to The Westinghouse Air Brake Company, Wilmerding, Pa., a corporation of Pennsylvania Application March 12, 1947, Serial No. 734,001

22 Claims. (Cl. 188—59)

This invention relates to vehicle brakes, and more particularly to disk type brakes for use on railway vehicles.

In accordance with the tempo of industrial progress, modern railway trains are increasing in speed. The vehicles of these trains must be provided with brake systems which will respond more rapidly, and absorb a greater amount of energy in a given time than was required of previous brake systems on slower trains, in order to insure their safe operation.

One object of the present invention is therefore to provide an improved disk brake mechanism particularly adapted for, though not limited to, use on modern railway train vehicles.

It is another object of the invention to provide an improved brake mechanism of the disk type comprising rotatable and non-rotatable friction brake elements and including means for dissipating the heat generated in these elements during frictional braking engagement thereof.

A further object of the invention is to provide an improved, relatively simple and compact disk brake mechanism adapted to be mounted as a unit directly on a wheel of a vehicle truck, such as is used on modern high speed trains.

Still another object of the invention is the provision of improved disk brake mechanism the wearing parts of which may be replaced easily without removal of the entire mechanism from its mounting.

Still another object of the invention is the provision of improved means, for supporting the rotatable and non-rotatable braking elements of the disk brake mechanism independently of the truck frame.

Other objects and advantages will be apparent from the following more detailed description of the invention.

In the accompanying drawings: Fig. 1 is an end elevational view of the improved brake mechanism as applied to a wheel of a wheel and axle assembly of a railway vehicle truck; Fig. 2 is a view taken in the direction of the arrow 2 in Fig. 1; Fig. 3 is a sectional view taken along the line 3—3 in Fig. 1; Fig. 4 is a sectional view of a portion of the brake mechanism showing in particular a release spring arrangement; Fig. 5 is an end elevation or face view of a rotatable brake element and rotatable supporting member assembly; Fig. 6 is a plan view of the rotatable supporting member; Fig. 7 is a perspective view of a portion of said rotatable supporting member; Fig. 8 is a top plan view of the mechanism taken in the direction of the arrow 8 in Fig. 1; Fig. 9 is a face view of one non-rotatable brake element; Fig. 10 is a sectional view of a portion of a similar non-rotatable brake element; Fig. 11 is a sectional view taken along the line 11—11 in Fig. 9; Fig. 12 is a sectional view taken along the line 12—12 in Fig. 9; and Fig. 13 is an elevation view of another portion of said non-rotatable brake elements.

*General description of disk brake mechanism*

As shown in the drawings, the improved brake mechanism is associated with a railway vehicle wheel 1, for the purpose of illustrating one application of the invention. The wheel 1 is provided with the usual flanged tread portion for engaging a rail 2, and with a center hub 3 in which there is secured the usual axle 4. The novel brake mechanism is preferably mounted inside the wheel 1 and comprises an annular rotatable supporting member 5 (Figs. 1, 3, 5 and 6), encircling the axle 4 and which is secured to the inner face of the center hub for rotation with the wheel in coaxial relation therewith. Rotatable annular friction brake elements 6 and 7 are provided encircling and carried by the supporting member 5 in axial alignment with the wheel 1 for rotation therewith. A non-rotatable supporting structure 8 is provided journaled on the supporting member 5. Fluid pressure brake cylinder devices 9 are provided carried by the supporting structure 8 for actuating non-rotatable annular friction braking elements 10, 11 and 12 into frictional interengagement with the rotatable friction brake elements 6 and 7. The rotatable elements 6 and 7 are interleaved with the non-rotatable elements 10, 11 and 12 which are slidably supported in axial alignment with said rotatable elements and the wheel 1 by non-rotatable tubular guide support torque members 13 which are comprised in the non-rotatable structure 8. An annular non-rotatable retaining member 14 is rigidly secured to one end of each of the torque members 13 to absorb thrust of the brake elements during braking operations. An annular non-rotatable pressure element 15 is slidably mounted on the members 13 between the brake cylinder devices 9 and the brake elements for evenly distributing brake cylinder thrust to said elements. Compression release springs 16, 17 and 18 are provided for urging the non-rotatable brake elements toward their release or rest positions, and compression release springs 19 and 20 are provided for urging the rotatable brake elements toward their corresponding release positions.

Detailed description of disk brake mechanism

Figure 8:
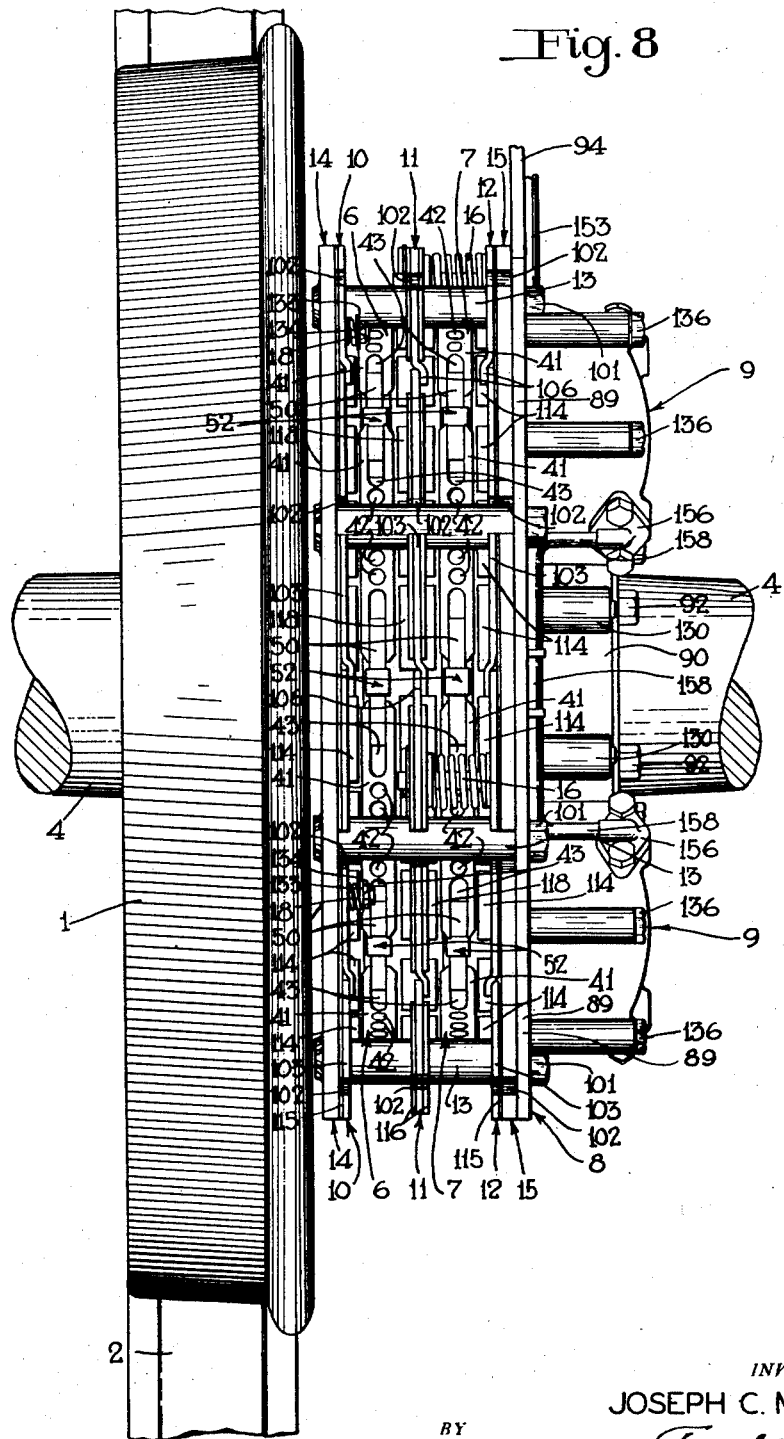

Referring to Figs. 3, 5 and 6, the supporting member 5 is provided with a radial flange 21 adapted to be mounted against the inboard end face of the wheel hub 3 coaxially therewith. Dowel bushings 22 extending through bores 23 provided in and spaced circumferentially about the flange 21 project into spaced counter-bores 24 in the wheel hub 3. Each bushing 22 is provided with a central through bore which is threaded to accommodate a tie bolt 25 which bolt extends from the outer face of the wheel hub 3 through bores 26 disposed longitudinally through said hub. A shoulder 27 is formed in each bushing 22 to cooperate with the outer face of the flange 21 so that action of the tightened bolts 25 on the bushings 22 is transmitted to said flange. The bushings are of close fit in the flange 21 and counter-bores 24, and act to accurately locate and support the member 5 on the wheel.

Referring to Figs. 3, 5, 6 and 7, the rotatable supporting member 5 is provided with a plurality of T-shaped torque transmitting guide support members 28 which are spaced about and secured to the flange 21. The members 28 are provided with integral ribs 29 depending from the inner surface thereof which are rigidly secured to a face of the flange 21 by means of welds 30.

Now referring to Figs. 5 and 6, the spaced torque transmitting members 28 on the member 5 define slots or grooves 31 bounded at their respective sides by shoulders 32 formed by the adjacent members 28 and extending longitudinally of said member.

Referring to Figs. 3 and 5, the rotatable annular friction elements 6 and 7, carried by the member 5, each comprises two annular coaxially aligned rings 33, spaced apart by lug members 34 to the outer faces of which the rings 33 are rigidly secured, by welding or other suitable means, to form the body portion of the elements 6 and 7. The lug members 34 are spaced circumferentially about the body portion rings 33 and are provided with inwardly projecting lugs 35 which extend into the slots 31 in slidable contact with the shoulders 32 to transmit torque from the rotatable elements 6 and 7 to the supporting member 5. The rotatable brake elements 6 and 7 are thereby arranged to rotate with the member 5 and remain free to slide axially relative thereto in the slots 31.

Referring to Figs. 3, 4, 5 and 6, the rotatable elements 6 and 7 are urged toward their release or rest positions by action of the previously mentioned springs 19 and 20 which are arranged as follows:

One end of each of the grooves 31 is closed by a retaining element 36 which is removably secured by means of bolts 37 to the members 28. Opposite ends of alternate grooves 31 are closed by similar retaining elements 38 which are secured to the members 28 by bolts 39.

The release compression springs 19 are disposed in the alternate grooves 31 interposed between retaining elements 36 and lugs 35 of rotatable element 6 to urge said lugs to seat against projecting ends of stop rods 40 to define a release position of the rotatable element 6. The rods 40 extend freely through openings in lugs 35 of rotatable element 7 and are secured at their opposite ends to the retaining elements 38.

The release compression springs 20 are disposed in adjacent grooves 31 extending freely through spring openings in lugs 35 of rotatable element 6 and interposed between retaining elements 36 and lugs 35 of rotatable element 7 to urge the lugs 35 on the adjacent rotatable element 7 to seat against the retaining members 38 and thereby define a release position of the rotatable elements 7 with respect to the supporting member 5.

Now referring to Figs. 3, 4, 5 and 8, Fig. 5 in particular, each of the rotatable braking elements 6 and 7 is provided with removable arcuate brake shoes 41 spaced about the periphery thereof. Each brake shoe 41 is preferably made of rolled steel and provided with a plurality of spaced ventilating openings 42 which extend therethrough transversely of their arcuate length for aiding in dissipating the heat generated during braking operations, and for reducing the weight of the shoe. The shoes 41 are spaced apart to allow for expansion and contraction thereof to take place freely without their consequent warpage.

An opening 43 is provided at the ends of each shoe 41 to accommodate tapered lugs 44 of the lug members 34, which lugs 44 project outwardly from the rings 33. A tapered bearing member 45 is formed in the ends of each shoe 41 to cooperate with the tapered lugs 44 for transmitting torque from the shoes to the lug members 34. The tapered lugs 44 and the shoe bearing members 45 have sloping cooperating faces 46 and 47, respectively. The adjacent faces 46 on each pair of adjacent lug members 34 are parallel to each other and to the mating faces 47 of bearing members 45 of a respective brake shoe 41. The shoes 41 are limited in inward movement by contact with a shoulder 48 formed in the lug members 34 at the base of their lugs 44, and are limited in outward movement by contact with a shoulder 49 formed by a removable keeper member 50.

Each keeper member 50 constitutes a retaining arm which spans the tapered ends of the two lugs 44 of each lug member 34 and thereby the interengaging and adjacent ends of two brake shoes 41, and which is provided with an inwardly projecting rib 51 at each of its ends which forms a bearing surface to cooperate with parallel outer faces of said two lugs for preventing longitudinal movement of said arm.

U-shaped securing members 52 are fitted over the keeper members 50, each member 52 comprising two strap members 53 which project into accommodating grooves 54 formed in opposite faces of the respective lug members 34 inside the rings 33. Pins 55 are provided for locking the strap members 53 to the body portions of the rotatable braking elements 6 and 7. The pins 55 extend through small bores 56 provided in the rings 33 and through registering bores 57 which extend through the lug members 34. The pins 55 are locked into place by twisted wires 58 extending through small transverse holes, located at opposite ends of said pins within the grooves 54 in the lug members. The outer ends of the pins 55 are substantially flush with the outer surfaces of the rings 33 and a transverse slot 59 is provided in one end of each pin to accommodate a screwdriver or similar tool for twisting the pins in the bores whereby the respective wires projecting through said holes engage with the side walls of the respective groove 54 and bend to form a type of lock member which will remain in place.

Referring to Figs. 3, 5 and 6 the rotatable supporting member 5 is provided with a supporting member hub or sleeve 60 extending outwardly from the base of the integrally attached flange 21 coaxially of the wheel 1. An annular shoulder 61 is formed in the hub or sleeve 60 adjacent to and spaced away from the flange 21. A spacer ring 62 is provided seated against the shoulder 61. Two ball bearings 63 and 64 of equal size are provided, having inner rings 65 and 66, and outer rings 67 and 68, respectively. A cylindrical bearing housing 69 is provided encasing the bearings 63 and 64 mounted on the outer bearing rings 67 and 68 thereof. The inner rings 65 and 66 of bearings 63 and 64 are mounted on the outer cylindrical surface of the supporting member hub 60 to rotate therewith. The inner ring 65 of bearing 63 is located seated against the end of the spacer ring 62, while the outer ring 67 thereof accommodates a shoulder 70 formed in the housing 69. Two intermediate spacer rings 71 and 72 of substantially equal length are provided separating inner bearing rings 65 and 66, and outer bearing rings 67 and 68, respectively. The spacer ring 71 has an inside diameter which is substantially equal to the inside diameter of the inner bearing rings 65 and 66. The outside diameter of the spacer ring 72 is substantially equal to the outside diameter of the bearing rings 67 and 68. An oil groove 73 is disposed centrally about the outer periphery of the ring 72, and a through port 74 opens the groove 73 to the interior of the housing. An outer end spacer ring 75 is interposed between the inner ring 66 of the bearing 64 and a retainer ring 76 which has screw-threaded connection with the outer end of the supporting member hub 60 for locking the bearing assembly in place. The inner end of the housing 69 is provided with an inwardly extending flange end wall 77 having an inner annular shoulder to cooperate with the outer peripheral surface of the ring 62 to prevent bearing lubricant from thereby escaping the housing, and, to prevent dust from entering. The inner annular surface of the housing end wall 77 is spaced away from the bearing 63 to form a chamber 78. An oil thrower ring 79 is inserted in an annular groove formed in the end of the ring 62 against which the inner bearing ring 65 seats. The ring 79 is shaped to project into the chamber 78 and is spaced a short distance away from the curved inner surface of the end wall 77. The outer end of the housing 69 is closed by an annular outer retaining wall member 80 shaped similar to the integral end wall 77 and removably secured to the outer end of the bearing housing 69 by means of cap screws 81 one of which is shown in Figs. 1 and 3, the others being enclosed by a thin washer 82. The inner surface of the member 80 is shaped to define a chamber 83 with the outer surface of the bearing 64 and a similar oil thrower ring 84 is provided in an annular groove formed in the inner end of the spacer ring 75 seated against the outer end of the inner bearings ring 66. The ring 84 projects into the chamber 83 spaced a short distance away from the inner surface of the member. An arcuate locking plate 85 is bolted to the outer end of the retaining ring 76 and overlapping the end of the hub 60. A pin 86 secured in a bore in the hub 60 extends therefrom and projects through one or another of a plurality of openings 87 in the plate 85 to cooperate with the walls of said opening for preventing rotation of the assembled retaining ring 76 relative to the supporting member hub 60.

Referring to Figs. 1 and 3, the non-rotatable supporting structure 8 comprises a substantially annular disk-shaped non-rotatable supporting member 88 carried by the bearing housing 69. The non-rotatable supporting member 88 comprises a radially projecting annular supporting flange 89 which is integrally attached to an axially projecting hub 90 which is provided with an inwardly projecting annular mounting flange 91. The inner surface of the supporting member hub 90 is mounted on a peripheral shoulder formed in the outer end of the bearing housing 69. The non-rotatable supporting member 88 is located and secured to the housing 69 by stud bolts 92 which extend through bores 93 spaced circumferentially about the flange 91 and which project into corresponding tapped holes which are open at the outer end of said housing. The thin annular washer 82 seats against the outer face of the supporting member mounting flange 91 and is provided with circumferentially spaced bores which register with the bores of said flange to accommodate the threaded projecting ends of the stud bolts 92 which hold said washer in place.

Referring to Figs. 1 and 2, the non-rotatable supporting member 88 is provided with a torque arm 94 which is disposed radially at the outer edge of the supporting flange 89 and rigidly secured thereto by welding or by any other suitable means. The torque arm 94 is provided with a webbed slot 95 which slidably engages with a torque rod 96 removably mounted in a torque rod hole in a stationary member 97 of the vehicle truck frame. The torque rod 94 is locked into place by an inverted U-shape locking pin 98 having two downwardly extending arms which project into accommodatings through bores provided in opposite ends of the torque rod 96 outside of the webbed slot 95. The locking pin 98 is held in place by a spring clip 99 which is secured to the truck member 97. The flange 89 of the supporting member 88 is thus secured against rotation.

Referring to Figs. 3 and 8, the non-rotatable tubular torque members 13 arranged in a circle around the rotatable elements are provided with internal threads at their one end, which end is welded to the walls of through bores 100 spaced about the outer edge of the retaining member 14 which is the shape of an annular disk of greater outside diameter than the outside diameter of the rotatable elements 6 and 7. The members 13 are therefore spaced from each other around the rotatable elements 6 and 7 and are rigidly secured by means of tie bolts 101 to the non-rotatable supporting member flange 89 against which their opposite ends seat. The tie bolts 101 project through bolt holes in flange 89 and into the members 13 to which the bolt ends have a screw-threaded attachment. The heads of bolts 101 seat on the outer surface of the supporting flange 89. The annular retaining member 14 is thus removably and rigidly secured to the non-rotatable supporting flange 89.

The non-rotatable torque members 13 slidably support, coaxial with the wheel 1 and against rotation therewith, the non-rotatable brake element 10 interposed between the annular retaining member 14 and the rotatable brake element 6, the non-rotatable brake element 11 interposed between the two rotatable brake elements 6 and 7, the non-rotatable brake element 12 and the annular non-rotatable pressure element 15 interposed between the rotatable brake element 7 and the supporting flange 89, in the order named. Each of the above named elements is provided with a plurality of spaced guide support slots 102

(Figs. 3, 8, 9 and 13) opening radially inward from the outer edge thereof of sufficient width to accommodate the cylindrical torque members 13 to form bearing shoulders which cooperate with said members 13 to slidably support said elements and secure them against rotation.

Referring to Figs. 3, 8, 9, 10 and 11, the non-rotatable friction brake elements 10, 11 and 12 comprises a body portion 103 in the form of a plurality of arcuate segments 104 of rolled steel plate having overlapping adjacent ends 105 which form joints 106 and 107. The single joint 107 is removably secured together by screws 108 which are locked into place by lock nuts 109; while the joints 106 may be secured by welds. The screw secured joint 107 renders it possible, upon removal of the screws, to spring the overlapping ends of this joint apart sufficiently to pass over the axle 4 when it is desired to replace a friction element.

The ends of each arcuate segment 104 are cut away to form an expansion space 110 adjacent each joint of the assembled body portion 103. Each of the arcuate segments is provided with one of the guide support slots 102.

Referring to Figs. 3, 4, 9, 10 and 13, each of the segments 104 of the non-rotatable elements 10 and 12 is provided with a plurality of tapered openings 111 extending from one face 112 to the opposite face 113 thereof. The ends of the openings 111 in the face 113 are larger than the ends of said openings in the face 112. A plurality of spaced apart brake shoes 114 are cast on the face 112 of each segment 104 over groups of tapered openings 111 so that molten metal during pouring flows into said openings. When cooled, each shoe 114 is thereby provided with a plurality of integrally cast means for securing said shoe to its respective segment 104, against the face 112 thereof and also against twisting or turning thereon. The shoes 114 are spaced apart on the segments 104, as above mentioned and as shown on the drawing, to provide spaces to allow for expansion and contraction of said shoes during braking operations without consequent damage thereto.

Each of the non-rotatable friction brake elements 10 and 12 is provided with an annular heat dissipating ring 115 made of a highly heat conductive metal such as copper. The rings 115 are shaped to seat flatly against the outer annular surface of the connected faces 113 of the segments 104 forming the steel body portion 103 for conducting heat away from said steel body portion communicated thereto from the shoes 114. Each annular ring 115 is shaped to conform with the general contour of the body portion 103, and is provided with guide support slots 102 and expansion spaces 110 to register with congruous slots and spaces of said body portion for purposes above mentioned.

Referring to Figs. 3, 4, 9, 11, 12 and 13, the non-rotatable friction brake element 11, interposed between the rotatable friction brake elements 6 and 7, comprises a similar body portion 103 in the form of joined arcuate segments 104 preferably of rolled steel plate. The segments are similarly connected at overlapping ends 105 to form joints 106 secured by welds, with provision of one joint secured by screws 108 to allow for inserting and removing the element by springing it over the axle.

The body portion 103 of the non-rotatable element 11 is also provided with expansion spaces 110 and guide support slots 102.

A plurality of arcuate heat dissipating segments 116 of highly conductive metal, such as copper, are provided on each of the opposite faces of the element 11. Each segment 116 is shaped congruously with the body portion segments 104 and each is provided with similar guide support slots 102. The length of the copper segments is less than the length of the steel segments 104, terminating short of the expansion spaces 110 and the overlapping ends 105 of said steel segments. Each segment 116 is also provided with openings 117 corresponding to the tapered openings 111 of elements 10 and 12 which register with corresponding openings 117 in the body portion 103 of element 11. The openings 117 are not tapered in the element 11, however (Fig. 12).

The copper segments 116 are arranged sandwich fashion on the steel segments 104 of the body portion, one copper segment on each side of the steel segment, and brake shoes 118 are cast over the copper segments, the molten metal flowing into the registering openings 117 in the segments 116 and 104 of copper and steel. When cooled, the cast metal forms two oppositely disposed shoes 118, one at each side of the body portion 104 in intimate contact with the outer surfaces of the copper segments 116 and integrally connected by cast metal within the openings 117. The shoes 118 thus cast serve to secure the copper segments 116 to the steel segments 104 as well as secure said shoes to the body portion 103 in contact with said highly heat conductive copper segments.

It will be appreciated that with the non-rotatable elements 10, 11 and 12 in their respective slidably supported positions opposite the rotatable elements 6 and 7 as previously described, the shoes 118 and 114 disposed about the annular non-rotatable elements 10, 11 and 12, are so proportioned and arranged with respect to the shoes 41 of the rotatable elements 6 and 7 as to be engageable therewith upon slidable compression of the interleaved rotatable and non-rotatable elements. It should also be pointed out that the diameter of the outer peripheral surface of the non-rotatable elements 10, 11 and 12 from which the guide support slots 102 open is sufficiently greater than the outside diameter of the rotatable elements 6 and 7 as to allow said slots to be disposed outside the projected periphery of said rotatable elements.

Now referring to Figs. 3, 8 and 9, the release springs 16 are interposed between the non-rotatable brake elements 11 and 12, and spaced circumferentially about the center edges thereof, around the rotatable element 7, adjacent to alternate non-rotatable torque members 13. Dish-shaped washer members 119 are provided which receive opposite ends of each spring 16 for location thereof. Each washer member 119 is provided with a central bore to accommodate a stop rod 120 which extends therethrough and is secured at its one end to the non-rotatable pressure member 15 and projects inwardly therefrom to extend through openings 121 and 122 provided in the non-rotatable brake elements 12 and 11. A washer 123 is provided over the projecting end of each stop rod 120 and is held in place by a pin through the end of said rod, the washer 123 acting to limit movement of the non-rotatable element 11 away from the non-rotatable element 12 by springs 16, for thereby defining the release position of element 11 with respect to element 12.

The pressure member 15 is urged to seat against the inner face of the supporting flange 89 by the compression release springs 17 which are spaced circumferentially about said flange and project from the outer face thereof. Each spring 17 encircles a stop rod 124 which is provided with a tapered end 125 secured in an accommodating tapered hole 126 in the member 15. The rods 124 project outwardly through relatively large bores 127 in the flange 89. Dish-shaped spring bearing members 128 are provided which encircle the rods 124 adjacent the tapered ends thereof, which members 128 form shoulders which seat on the outer face of the flange 89 to transmit thrust from the springs 17 thereto. The opposite ends of the springs 17 seat on cap washer members 129 which are removably secured to the outer projecting ends of the rods 124. A spring cover 130 is provided over each spring assembly and secured at one end to the respective spring bearing member 128.

It will be appreciated that action of the springs 17 urge the member 15 to a release or rest position against the supporting member flange 89 which locates the attached rods 120 to define the corresponding release or rest position of the non-rotatable element 11.

The non-rotatable element 10 is urged to seat against the annular retaining member 14 by action of the compression springs 18, which are spaced about the outer edge of said element adjacent to alternate non-rotatable torque members 13. Rods 131 are provided having tapered ends 132 secured in tapered holes spaced circumferentially about the member 14. The rods 131 project inwardly through openings in the element 10, and mounted on the projecting ends thereof are washer members 133 and removable caps 134 which hold the outer washer members 133 in place on the rods. The compression springs 18 encircle the rods 131 and are interposed between the washer members 133 and the inner face of the member 14.

Now referring to Figs. 1, 3, and 8, the fluid pressure brake cylinder devices 9 are individual and are spaced circumferentially about the outer surface of the non-rotatable supporting flange 89.

Each brake cylinder device 9 comprises a casing 135 secured to the flange 89 by bolts 136 and is provided with a bore 137 opening at one end of the casing and closed at the opposite end by an end wall 138. A piston 139 is slidably disposed in bore 137, dividing said bore into an atmospheric chamber 140 and a pressure chamber 141. A resilient diaphragm gasket 142 is provided on the pressure side of piston 139 which is adapted and arranged to cooperate with the cylindrical wall of chamber 140 to prevent leakage of fluid under pressure past the piston from chamber 141. A piston release compression spring 143 is interposed between the supporting flange 89 of the non-rotatable structure 8 and each piston 139 in the atmospheric chambers 140. A dirt protector 144 is disposed in each atmospheric chamber 140 to prevent dirt from gaining access to the cylindrical surface of the bore 137 traversed by the piston. Each protector 144 comprises a rigid cup-shaped securing member 145 which is received in an accommodating cavity on the atmospheric side of each piston and is held in place therein by action of the spring 143, one end of which abuts thereagainst. A resilient frustrated conical shaped member 146 is provided each protector which is secured and sealed at its smaller end to the peripheral edge of the open end of the securing member 145 by means of a removable retainer ring 147. The larger end of the resilient member 146 is removably secured to the casing 135 at the otherwise open end of the bore 137 by a similar retaining ring 148. A hollow piston rod 149 is centrally disposed in each chamber 140 extending through a central opening in each protector member 145 and each is rigidly secured at one end to the piston 139. The opposite end of each rod 149 projects through a bore 150 in the supporting flange 89 for engagement with the annular pressure member 15.

Referring to Figs. 1 and 8, a brake pipe in the form of a flexible hose, 151 is provided for conveying fluid under pressure from a suitable source to the brake cylinder devices 9. The hose 151 is connected to a coupling 152 which is secured to the torque arm 94. A pipe 153 communicates the coupling 152 with two branch pipes 154 which are open to the pressure chambers 141 of the two adjacent brake cylinder devices 9 by way of the passages 155 in reinforced fitting members 156, bolted to the outside of the cylinder casings 135, and registering passages 157 in said casings. The pressure chambers 141 of the two brake cylinder devices 9 just mentioned are in turn open to the remaining brake cylinder pressure chambers 141 by way of pipes 158 and other corresponding passages 155 and 157, which other passages are not shown.

*Assembling of the brake mechanism*

The brake mechanism is initially adapted to be assembled as a unit on a bench or the like remote from the vehicle wheel to which it is to be applied. This unit is then secured to the vehicle wheel.

The assembling of each brake mechanism may be accomplished in the following manner; the various parts hereinbefore described as being welded together having already been secured in the proper working relation.

Assume that the brake mechanism is to be assembled on a horizontal flat surface or table, the annular retaining member 14 is laid flat on said surface disposing the tubular torque members 13 and rods 131 attached thereto upward. The slots 102 of the heat dissipating ring 115 are brought into registry with the projecting ends of the members 13 and with the openings in said ring for receiving rods 131 also in alignment, said ring is dropped into place against the member 14. The body portion 103 of the non-rotatable friction element 10 is similarly located and dropped into place on top of the ring 115 with the openings 102 in said portion encircling the rods 131 which project upwardly therethrough, and disposing the attached brake shoes 114 on the top. The springs 18 are then dropped into place encircling the rods 131 and resting on the upper face of the body portion 103 of the element 10. Next cap washer members 133 are introduced to the ends of the springs 18, pressed down and secured to the ends of the rods 131 by the caps 134, thereby compressing said springs between the element 10 and said members.

Now, separate and apart from the above assembly, the dowel bushings 22 are pressed into the bores 23 of the supporting member flange 21. The retaining elements 36 are bolted to the members 28 of the supporting member 5. The spacer ring 62 is slipped over the supporting member hub 60 and seated against the supporting member shoulder 61. The housing 69 is slipped over the hub 60 with the flange end wall 77 thereof encircling the spacer ring 62, and the oil thrower ring 79 is inserted in place. The ball bearing 63 is inserted inside the housing on the hub followed by the spacer rings 71 and 72, the ball bearing 64, the oil thrower ring 84, the spacer ring 75 and the wall member 80. The retaining ring 76 is then screwed onto the outer end of the hub 60 to secure the bearing and housing assembly into place on said hub.

The supporting member 5 and associated parts just assembled is then dropped into place within the inner peripheral clearance of the annular retaining member 14 and non-rotatable element 10 resting on the flat surface, as previously described. Blocks may be used to raise the member 5 for proper orientation with respect to the retaining member 14 and element 10. The release springs 19, Fig. 3, are then inserted in their proper slots 31 between alternate retaining elements 36 against which the lower ends of said springs rest. The rotatable element 6, including the removably attached shoes 41, is now slipped over the bearing housing 69, the lugs 35 of said element being properly oriented with respect to the slots 31 of the supporting member 5, and said element 6 is dropped into place with its lugs 35 registering with the shoulders 32 which define the sides of said slots 31. The element 6 is thus supported horizontally by the springs 19 on which each alternate lug 35 thereof now rests. The slots 102 of the non-rotatable element 11 are next brought into registry with the upwardly projecting tubular torque members 13 and said element is dropped onto the rotatable element 6. The springs 20 are then dropped into the spring openings through the lugs 35 of the rotatable element 6, and the assembled rotatable element 7, including its shoes 41, is added in fashion, similar to the addition of the element 6, to rest on the upper ends of the springs 20. The retaining elements 38 and attached stops 40 are then secured to the upper ends of the members 28 by the bolts 39.

Again, separate and apart from the above assembly the non-rotatable element 12 including the copper ring 115 is next aligned so that the openings 121 thereof register with the projecting ends of the rods 120 attached to the annular pressure element 15, and then said element 12 is slid on said rods until the copper ring 115 thereof seats on said element 15. The washer members 119 are then placed on each end of each of the springs 16 and these washer and spring assemblies placed on the rods 120 which project through central bores of said members 119. Each of the springs 16 is next compressed until the outer washer member 119 thereon passes over a small bore 159 opening transversely through each rod 120, a nail or piece of stiff wire (not shown) is then inserted in the bore 159, and the spring is released to seat said outer washer member against said nail. The springs 16 and outer washer members 119 are thus temporarily secured in place a substantial distance from the projecting ends of the rods 120 to facilitate further assembly of the brake mechanism as a unit, as will be presently described, while the non-rotatable element 12 is held seated against the pressure element 15.

The pressure element 15, and non-rotatable element 12 held thereagainst by the action of the springs 16, are then placed horizontally above the rotatable brake element 11 with the rods 120 disposed downwardly and the rods 124 disposed upwardly from the top surface of said element 15. Elements 12 and 15 are then rotated until the slots 102 thereof register with the tubular members 13 and the ends of the downwardly projecting rods 120 register with the openings 122 of the element 11, and dropped into place with said rods 120 projecting through the openings 122. The washers 123 are then slipped over the ends of the rods 120 and secured in place by the respective pins. The nails or wires are now pulled from the rod bores 159 thus releasing the springs 16 which act to urge the non-rotatable elements 11 and 12 apart.

Assume that the brake cylinder devices 9 have been bolted to the supporting member flange 89 and connected by pipes 153 and 154, 153 to the coupling 152, the supporting member hub 90 is then slipped over the upper end of the bearing housing 69 and aligned so that the upwardly projecting rods 124 of the annular pressure element 15 project through the bores 127 of the supporting member flange 89 and the tie bolt holes in said flange register with the upper ends of the tubular members 13. The tie bolts 101 are then inserted and screwed in place to secure the annular retaining member 14 rigidly to the supporting member flange 89. The thin washer 82 is placed on the outer face of the supporting member mounting flange 91 and the studs bolts 92 are then inserted through bores 93 in flange 91 and screwed in place in the aligned threaded bores in housing 69 to secure the supporting member 8 rigidly to the bearing housing 69.

The spring bearing members 128 are next dropped into place around the rods 124 to rest on the supporting member flange 89 around the bores 127. The springs 17 are placed on the rods 124 to rest on the members 128, the cap washer members 129 are then placed on said rods compresing the springs, and the spring covers 130 secured in place to complete the assembly of the brake mechanism unit ready for securing to the wheel.

The brake mechanism unit is now positioned on the wheel 1 so that the rotatable supporting member flange bushings 22 fit into the wheel hub counter-bores 24. The bolts 25 are then inserted into the outer ends of the wheel hub bores 26 and screwed into the bushings 22 to secure the brake mechanism unit to the wheel.

The wheel is then pressed on to the axle of a vehicle truck disposing the brake mechanism inboard of said wheel. The brake mechanism torque arm 94 is next raised into position in the truck member 97 and located so that the torque arm slot 95 registers with the torque rod hole in said member 97, the torque rod 96 is inserted in the slot 95 and through said hole, and the U-shaped locking pin 98 dropped into place. The spring clip 99 is sprung to accommodate the locking pin 98 which is rocked under it and then said clip is released to lock said pin into position to prevent its being jarred out by any road shock transmitted from the wheel rolling on the rail.

The brake pipe hose 151 is connected to the coupling 152 to complete the installation of the brake mechanism which is now ready for operation.

*Operation of the brake mechanism*

With the brake mechanism applied to the wheel as above described, if it is desired to brake said wheel, fluid under pressure is supplied via the pipe 153, pipes 154, passages 155 and 157, and pipes 158 to the pressure chambers 141 of the brake cylinder devices 9 wherein it acts on the brake cylinder pistons 139 to effect movement thereof in the direction of the wheel 1.

As the brake cylinder pistons 139 are thus operated they act through the piston rods 149 to shift the annular pressure element 15 away from the supporting flange 89 along the tubular torque members 13 and against the opposing action of the springs 17. The pressure element 15 thus carries the non-rotatable brake element 12 into engagement with the rotatable brake element 7. Upon such engagement, the rotatable brake element 7 is picked up and moved, against the opposing action of the springs 20, along the slots 31 between the torque transmitting members 28 into engagement with the non-rotatable brake element 11 which is then picked up and moved along the tubular members 13 into contact with the rotatable brake element 6. Further movement carries the element 6 along the slots 31 against the opposing action of the springs 19 until said element 6 moves into contact with the non-rotatable brake element 10. At this time all of the brake elements are in contact and the brake shoes and friction surfaces thereof are in frictional interengagement. The release springs 16 will have been further compressed between the non-rotatable brake elements 11 and 12 during the above described movements.

After the several brake elements are thus moved into frictional interengagement, the pressure of fluid acting on the brake cylinder pistons 139 tends to force said elements in the direction of the wheel 1, while the thrust of such force is taken by the annular retaining member 14 which is rigidity secured by bolts 101 to the non-rotatable supporting member flange 89 to which the brake cylinder casings 135 are secured. The rotatable brake elements 6 and 7, and the non-rotatable brake elements 10, 11 and 12 are thus subjected to a squeezing action between the retaining member 14 and the pressure element 15. As a result of this action, the interengaging brake shoes of the non-rotatable elements 10, 11 and 12 cause a drag or restraining friction force on the brake shoes of the rotatable brake elements 6 and 7 thereby effecting braking of said rotatable elements, which braking is transmitted by way of the rotatable brake element lugs 35 and rotatable torque transmitting members 28 to the supporting member 5 and thence through the dowel bushings 22 to the wheel 1 for effecting braking thereof. The degree with which the rotatable elements and thereby the wheel 1 are braked, as just described, depends upon the pressure of fluid supplied to chambers 141 acting on the brake cylinder pistons 139, as will be apparent. During braking the shoulders defining the slots 102 in the non-rotatable elements 10, 11 and 12 bear against the tubular torque members 13 which transmit such torque forces to the non-rotatable supporting member flange 89 which in turn transmits said forces to the stationary truck member 97 (Fig. 1) by way of the torque arm 94, and the torque rod 96, whereby the non-rotatable brake elements 10, 11 and 12 are held against turning.

When it is desired to effect a release of the brakes after an application, fluid under pressure is vented from the brake cylinder pressure chambers 141 by way of pipes 158, 154, 153 and 151, and passages 155 and 157, whereupon the release springs 16 and 17 acting on the non-rotatable brake elements 11 and 12, the release springs 19 and 20 acting on the rotatable brake elements 6 and 7, and the piston release springs 143 are permitted to act to move said brake elements and the brake cylinder pistons 139 back to their release positions previously described, in which positions the non-rotatable elements are disengaged from the rotatable elements, as shown in the drawings.

Operation of cooling arrangements

Upon rotation of the rotatable brake elements 6 and 7, the walls of the openings 42 of the brake shoes 41 act as centrifugal fan or blower blades which draw air from the inner periphery of said rotatable elements through said openings to the outer periphery of said elements. During braking, when the rotatable element brake shoes 41 are in frictional engagement with the non-rotatable element brake shoes 114 and 118, heat is generated by such engagement which is absorbed by said brake shoes. The air currents drawn through the openings 42, as above described, act to cool the brake shoes 41 of the rotatable elements 6 and 7, and being discharged at the outer periphery thereof create turbulent air currents which sweep over the outer faces of the copper segments 116 of the non-rotatable brake element 11 and thereby aid in cooling said segments which conduct heat away from the brake shoes 118 with which said copper segments are in contact. The copper rings 115 of the non-rotatable elements 10 and 12 aid in conducting the heat away from the brake shoes 114 of said elements.

Servicing of the brake mechanism

The brake mechanism can be serviced without dropping the axle or pulling the wheel. The entire mechanism can be disassembled from the rotatable supporting member 5 and strung along the axle 4 in the reverse order of the previously described assembly. Should it be desired to replace a brake shoe 41 on either of the rotatable brake elements 6 or 7, same can be done without removing the body portion of the element from the axle. To accomplish this, the keeper member securing pins 55 are punched out to shear the bent wires which act to lock them in place, thereby releasing the strap members 53 and keepers 50 to free the brake shoe to be replaced. The replacement shoe would then be inserted in position and secured in place by reassembling the keepers and strap members onto the body portion. If it is desired to replace any of the non-rotatable brake elements which may be worn, same can be done by springing the joint 107 secured by the screws 108, which are first removed, and slipping the non-rotatable element over the axle. Any non-rotatable replacement element would similarly be sprung over the axle into its proper position thereon ready for reassembly in the brake mechanism. It can readily be seen that any other part of the brake mechanism which may be subject to wear can be serviced without removing the entire brake mechanism as a unit from the wheel and axle assembly, including the brake cylinder devices 9 which may be removed for servicing by removing the bolts 136 which secure the casing to the supporting flange 89, and the bolts which secure the fitting members 156 to said casing.

Summary

From the above description it will now be evident that the novel brake mechanism is relatively simple and compact in structure. The brake mechanism may be completely assembled as a unit and applied to the wheel before the wheel is pressed onto the axle. Service of the brake mechanism may be accomplished without dropping an axle or pulling a wheel since the elements and parts thereof may be disassembled around the axle and supported thereon in their proper order of assembly while wearing parts are replaced. Adequate provision is made for cooling the brake shoes, thereby adding to the prospective life thereof.

While one illustrative embodiment of the invention has been described in detail it is not the intention to limit its scope to that embodiment or otherwise than by the terms of the appended claims.

Having now described my invention, what I claim as new and desire to secure by Letters Patent, is:

1. A disk brake mechanism for a railway vehicle wheel comprising a rotatable brake element secured to rotate with said wheel and having a plurality of openings extending therethrough from the inner edge to the outer edge thereof, the defining walls of which openings act as vanes for causing air currents to flow outward through said openings during rotation of said brake element, a non-rotatable friction brake element comprising friction elements for engaging said rotatable brake element, heat dissipating elements of highly heat conductive metal in contact with said friction elements and extending therefrom into the region of said air currents, and actuating means for effecting interengagement between said rotatable brake element and said non-rotatable friction brake element.

2. In a disk brake mechanism, in combination, two rotatable brake elements having a plurality of openings extending therethrough from the inner edges to the outer edges thereof and having a plurality of expansion slots in the braking faces thereof the side walls of which slots act as fan blades which create outward currents of air during rotation of said brake elements, a non-rotatable brake element interposed between said rotatable brake elements, said non-rotatable brake element comprising a plurality of brake shoes spaced circumferentially thereabout for frictional engagement with said rotatable brake elements, and highly heat conductive members in contact with said shoes and extending outwardly therefrom into the region of said currents of air.

3. In a disk brake mechanism for a railway vehicle wheel, in combination, rotatable brake elements secured to rotate with said wheel and having a plurality of openings extending from the inner edges to the outer edges thereof and also having a plurality of radially extending expansion slots in the braking faces thereof the walls of which openings and slots act as fan blades which create outwardly directed currents of air during rotation of said rotatable brake elements, a non-rotatable supporting structure surrounding said rotatable elements, said structure comprising a retaining member disposed opposite one end of said rotatable brake elements, a plurality of guide and support members rigidly secured at their one end to said retaining member, a supporting member secured to the opposite ends of said guide support members, non-rotatable brake elements disposed within and carried by said rotatable supporting structure, said rotatable elements being interleaved with said non-rotatable brake elements, said non-rotatable brake elements comprising a plurality of segmental brake shoes spaced circumferentially thereabout for frictional engagement with said rotatable brake elements, and highly heat conductive elements in contact with said shoes and extending therefrom into the region of said currents of air.

4. In a disk brake mechanism for a railway vehicle wheel, in combination, a sleeve member secured to rotate with said wheel, a rotatable brake element carried by said sleeve member for rotation therewith, said brake element having a plurality of openings extending from the inner periphery to the outer periphery thereof, a first annular non-rotatable supporting member journaled on said sleeve member, torque transmitting guide and support members spaced around and secured at their one end to said first annular non-rotatable supporting member and extending over and spaced from the periphery of said brake element, a second annular non-rotatable supporting member secured to opposite ends of said guide support members, annular non-rotatable brake elements disposed one on each side of said rotatable brake element and carried by said guide support members and having a plurality of circumferentially spaced friction elements for engagement with said rotatable brake element, and annular heat conductive members interposed between said non-rotatable brake elements and said non-rotatable supporting members.

5. In a disk brake mechanism for a railway vehicle wheel, in combination, an annular supporting member secured to said wheel for rotation therewith, a plurality of circumferentially spaced torque transmitting members secured to said supporting member and defining a plurality of grooves extending in the direction of said wheel, a first annular rotatable brake element encircling said members and having inwardly projecting lugs slidably disposed in said grooves, a second rotatable annular brake element having similar lugs slidably disposed in said grooves and having openings therethrough within said grooves, first retaining elements closing the ends of said grooves adjacent to said first rotatable element, second retaining elements removably secured to said members and closing opposite ends of said grooves, stop rods secured to said second retaining elements and projecting therefrom through said openings into the path of movement of said lugs of said first rotatable element, and release compression springs interposed between the first retaining elements and the first rotatable element lugs for urging them to seat against the stop rods.

6. In a disk brake mechanism for a railway vehicle wheel, in combination, an annular supporting element secured to rotate with said wheel, a plurality of circumferentially spaced torque transmitting members secured to said supporting element and defining grooves extending axially of said wheel, a first annular rotatable brake element encircling said members and having inwardly projecting members slidably disposed in said grooves, said projecting members having spring openings therethrough within said grooves, a second rotatable element having inwardly projecting lugs slidably disposed in said grooves opposite to said first rotatable element, first retaining elements closing said grooves at their one end adjacent said first rotatable element, second retaining elements closing the opposite ends of said grooves, and release compression springs extending through said openings and interposed between said first retaining elements and said lugs for urging said lugs to seat against said second retaining elements.

7. In a disk brake mechanism for a railway vehicle wheel, in combination, an annular supporting element secured to rotate with said wheel, a plurality of torque transmitting members secured to and spaced about said supporting element and cooperating with each other to form axially extending guide slots, a first rotatable element having inwardly projecting members slidably disposed in said slots, a second rotatable element having inwardly projecting lugs slidably disposed in said slots opposite said projecting members, first retaining members closing the ends of said slots adjacent to said first rotatable element, second retaining members closing opposite ends of alternate slots adjacent to said second rotatable element, a stop member secured to each second retaining member and projecting therefrom through openings in said lugs of said second rotatable element into the path of movement of said projecting members, first release compression springs interposed between alternate first retaining members and said projecting members to urge said projecting members to seat against said rods, and second release compression springs interposed between said first retaining members and certain lugs of said second rotatable element to urge other lugs of said second rotatable element to seat against the second retaining members.

8. A disk brake mechanism for a railway vehicle wheel, comprising a first annular member, torque transmitting guide support members secured at their one end to said first annular member, a second annular member spaced away from said first annular member in coaxial relationship therewith and secured to opposite ends of said guide support members, means for securing said second annular member against rotation, a first non-rotatable brake element carried by said guide support members, first spring means for urging said first non-rotatable brake element to seat against said first annular member, a second non-rotatable brake element carried by said guide support members, second release spring means for urging said second non-rotatable brake element to seat against said second annular member, a rotatable brake element secured to rotate with said wheel and interposed between said non-rotatable brake elements for frictional engagement therewith, and brake cylinder means secured to said second annular member for effecting said engagement.

9. A disk brake mechanism for a railway vehicle wheel, comprising a sleeve member secured to rotate with said wheel, a first annular member journaled onto said sleeve member, means securing said first annular member against rotation, torque transmitting guide support members removably secured at their one end to said first annular member, a second annular member spaced away from said first annular member in coaxial relationship therewith and rigidly secured to opposite ends of said guide support members, a first non-rotatable element carried by said guide support members, a first highly heat conductive element interposed between said first non-rotatable element and said first annular member, release spring means for urging said first non-rotatable element and the interposed heat conductive element toward said first annular member, a second non-rotatable element carried by said guide support members, a second highly heat conductive element interposed between said second non-rotatable element and said second annular member, spring members for urging said second non-rotatable element and the heat conductive element in contact therewith to seat against said second annular member, an annular rotatable brake element secured to rotate with said sleeve member and interposed between said first and second non-rotatable elements for frictional engagement therewith, said rotatable brake element having a plurality of openings therethrough extending from the inner peripheral edge to the outer peripheral edge thereof, and brake cylinder means secured to said first annular member for effecting said frictional engagement.

10. In a disk brake mechanism for a railway vehicle wheel, in combination, a first backing member, torque transmitting guide support members secured at their one end to said first backing member, a second backing member secured to opposite ends of said guide support members and spaced away from said first backing member, means securing said second backing member against rotation, a first non-rotatable braking element disposed between said members and carried by said guide support members, spring means for urging said first non-rotatable braking element to seat against said first backing member, a second non-rotatable braking element disposed between said members and carried by said guide support members, a pressure member interposed between said second non-rotatable braking element and said second backing member and carried by said guide support members, first release spring means for urging said pressure member to seat against said second backing member, a third non-rotatable braking member disposed between said first and second non-rotatable brake elements and carried by said guide support members, spaced stop members secured at one end to said pressure member and projecting therefrom through openings in said second and third non-rotatable elements, a stop element secured to the projecting end of each of said stop members between the first and second non-rotatable elements, and second release spring means for urging said second non-rotatable element to seat against said pressure member and for urging said third non-rotatable element to seat against the stop elements.

11. In a disk brake mechanism for a railway vehicle wheel, in combination, a rotatable supporting member comprising a sleeve, an annular flange integrally connected to one end of said sleeve, dowel bushings circumferentially spaced about said flange and projecting therefrom, bolts extending in an axial direction through said wheel and securing said dowel bushings in bores therein for securing said supporting member to rotate therewith in coaxial relationship, a plurality of torque transmitting guide support members secured to and circumferentially spaced apart about said flange to define grooves extending in an axial direction, and a rotatable braking element having inwardly projecting lug members slidably disposed in said grooves.

12. A disk brake mechanism for a railway vehicle wheel, comprising a sleeve member secured to rotate with said wheel, torque transmitting members secured to said sleeve member and spaced apart circumferentially thereabout to define grooves extending in a direction longitudinally of said sleeve member, annular rotatable braking elements encircling said torque members and slidably mounted in said grooves in coaxial relationship with said sleeve member, a first annular member journaled onto said sleeve member, means securing said first annular member against rotation, tubular guide support members secured to said first annular member projecting therefrom and spaced around said rotatable braking elements, a non-rotatable braking element carried by said guide support members and interleaved with said rotatable braking elements for frictional interengagement therewith, brake cylinder means secured to said first annular supporting member for compressing the interleaved braking elements to effect said interengagement, and a second annular member secured to said guide support members for absorbing the thrust of said compressing.

13. A torque transmitting member for carrying and rotating an axially movable rotatable brake element of a disk brake mechanism of the type in which said element has a plurality of spaced inwardly projecting torque transmitting lugs, said member comprising a sleeve, an outwardly projecting radial flange integral with one end of said sleeve, and a plurality of individual spaced apart, substantially T shaped torque transmitting members arranged around said flange and comprising a first part extending radially of said flange and secured thereto and a second and integral part extending at right angles to said first part, longitudinally of said sleeve, adjacent faces of each two of said second parts constituting guides for slidable contact with opposite sides of said lugs.

14. A torque transmitting structure for carrying and rotating an axialy movable rotatable brake element of a disk brake mechanism of the type in which said element has a plurality of spaced inwardly projecting torque transmitting lugs, said structure comprising a sleeve, an outwardly projecting radial flange integral with one end of said sleeve, said flange having a plurality of spaced through bores extending longitudinally of said sleeve, a torque transmitting dowel disposed in each of said bores and comprising a body portion extending through the bore and beyond one end of said sleeve and the adjacent face of said flange and an integral head engaging the opposite face of said flange, each dowel having an axially arrangd screw-threaded bore to receive a securing bolt, and a plurality of individual spaced apart, substantially T shaped torque transmitting members arranged around said flange and comprising a first part extending radially of said flange and secured thereto and a second and integral part extending at right angles to said first part, longitudinally of said sleeve, adjacent faces of each two of said second part constituting guides for slidable contact with opposite sides of said lugs.

15. A torque transmitting member for carrying and rotating an axially movable rotatable brake element of a disk brake mechanism of the type in which said element has a plurality of spaced inwardly projecting torque transmitting lugs, said member comprising a sleeve, an outwardly projecting radial flange integral with one end of said sleeve, and a plurality of individual spaced apart, substantially T shaped torque transmitting members arranged around said flange and comprising a first part extending radially of said flange and secured thereto and a second and integral part extending at right angles to said first part, longitudinally of said sleeve, adjacent faces of each two of said second parts constituting guides extending longitudinally of said sleeve and parallel to the radius of said sleeve for slidable contact with opposite sides of said lugs.

16. A disk brake mechanism for application to the inner or inboard side of a vehicle wheel preparatory to mounting the wheel on an axle, said brake mechanism comprising a rotatable sleeve member, rotatable and non-rotatable braking elements carried by said sleeve member and operative relative to said sleeve member to frictionally interengage with each other, power means also carried by said sleeve member operative to actuate the brake elements, means for holding said sleeve member, friction braking elements and power means together as an operative unitary structure for application to said wheel, said sleeve member having an interior diameter great enough to accommodate the axle when the wheel is being pressed thereon, and means operative with said mechanism assembled into said unitary structure to secure said sleeve member to said wheel for rotation therewith.

17. A disk brake mechanism for a vehicle wheel comprising a sleeve, a flange integral with one end of said sleeve for attachment to said wheel, a pile of annular brake elements arranged in coaxial relation to said sleeve and comprising a plurality of non-rotatable brake elements and interleaved rotatable brake elements, a plurality of torque transmitting elements spaced around and secured to said flange and each adjacent pair providing a slot extending lengthwise of said sleeve, said rotatable brake elements comprising lugs extending into the slots between adjacent torque elements and having sliding contact with opposite walls of said elements, a first annular backing element journaled on said sleeve adjacent the non-rotatable brake element at the adjacent end of said pile, a second annular backing element disposed at the opposite end of said pile for supporting the adjacent non-rotatable brake element, a plurality of sleeves spaced from and arranged around the peripheries of said rotatable brake elements parallel to the axis thereof and integrally secured at one end to said second backing element, the opposite ends of said plurality of sleeves engaging said first backing element, screw means rigidly securing said first backing element to said opposite ends of said plurality of sleeves, said non-rotatable brake elements having slots open at the peripheries thereof in which said plurality of sleeves are disposed, and a plurality of individual brake cylinder devices spaced apart around the face of said first backing element opposite said pile and removably secured thereto, and means including a rod extending from each brake cylinder device through an opening in said first backing plate for acting on the adjacent non-rotatable element for pressing said pile of elements into frictional interengagement against said second backing element.

18. A disk brake mechanism for a railway vehicle wheel, comprising a first annular member, torque transmitting guide support members secured at their one end to said first annular member, a second annular member spaced away from said first annular member in coaxial relationship therewith and secured to opposite ends of said guide support members, means for securing said second annular member against rotation, a first non-rotatable brake element carried by said guide support members, means for securing said first non-rotatable brake element to said first annular member, a second non-rotatable brake element carried by said guide support members, release spring means for urging said second non-rotatable brake element to seat against said second annular member, a rotatable brake element secured to rotate with said wheel and interposed between said non-rotatable brake elements for frictional engagement therewith, and brake cylinder means secured to said second annular member for effecting said engagement.

19. A torque transmitting member for carrying and rotating an axially movable rotatable brake element of a disk brake mechanism of the type in which said element has a plurality of spaced inwardly projecting torque transmitting lugs, said member comprising a sleeve, an outwardly projecting radial flange integral with one end of said sleeve, and a plurality of individual spaced apart, substantially T-shaped torque transmitting members arranged around said flange and comprising a first part extending radially of said flange and secured thereto and a second and integral part extending at right angles to said first part, longitudinally of said sleeve, said second parts forming grooves for slidable contact with opposite sides of said lugs.

20. A disk brake mechanism for application to the inner or inboard side of a vehicle wheel preparatory to mounting the wheel on an axle, said brake mechanism comprising a rotatable sleeve member, rotatable and non-rotatable braking elements carried by said sleeve member and operative relative to said sleeve member to frictionally interengage with each other, power means also carried by said sleeve member operative to actuate the brake elements, means for holding said sleeve member, friction braking elements and power means together as an operative unitary structure for application to said wheel, said sleeve member having an interior diameter sufficiently great to accommodate said axle when said wheel is being pressed thereon, and means operative from the outboard face of said wheel for securing said sleeve member and thereby said unitary structure to said wheel.

21. In combination, a truck frame, an axle journaled in said frame, a wheel mounted on said axle for rotation relative to said frame, a sleeve member encircling said axle with clearance and removably secured to and carried by said wheel, rotatable braking elements splined to said sleeve member, non-rotatable braking elements interleaved with said rotatable breaking elements, power means journaled on said sleeve at one end of the interleaved braking elements for effecting frictional engagement therebetween, a thrust absorbing element disposed at the opposite end of said interleaved braking elements, rigid means supportingly connecting said thrust absorbing element with said power means and slidably supporting said non-rotatable braking elements, and torque transmitting means removably connected to said truck frame to prevent rotation of said power means and said non-rotatable braking elements with said wheel.

22. A brake mechanism adapted to be applied to and removed from, as a unit, the inboard side of a wheel in a railway vehicle wheel and axle assembly comprising an annular rotatable friction brake element, an annular non-rotatable friction brake element, brake cylinder means for effecting inter-engagement between the rotatable and non-rotatable friction brake elements for braking said wheel, a rotatable structure carrying said rotatable friction brake element, a non-rotatable structure journaled on said rotatable structure carrying said rotatable element and brake cylinder means, and means for removably securing said brake mechanism as a unit to the inboard side of said wheel, said means being removable and replaceable from the outboard side of said wheel.

JOSEPH C. McCUNE.

REFERENCES CITED

The following references are of record in the file of this patent:

UNITED STATES PATENTS

| Number | Name | Date |
| --- | --- | --- |
| 340,580 | Huber | Apr. 27, 1886 |
| 2,174,395 | Aikman | Sept. 26, 1939 |
| 2,204,807 | McCune et al. | June 18, 1940 |
| 2,211,888 | Farmer | Aug. 20, 1940 |
| 2,218,615 | McCune | Oct. 22, 1940 |
| 2,355,122 | Tack | Aug. 8, 1944 |
| 2,381,941 | Wellman et al. | Aug. 14, 1945 |